United States Patent
Hackstein et al.

(10) Patent No.: US 10,487,746 B2
(45) Date of Patent: Nov. 26, 2019

(54) OPTIMIZATION OF COLD STARTS IN THERMAL POWER STATIONS, IN PARTICULAR IN STEAM-ELECTRIC POWER PLANTS OR IN COMBINED CYCLE POWER PLANTS (CCPPS)

(71) Applicant: Siemens Aktiengesellschaft, Munich (DE)

(72) Inventors: Holger Hackstein, Dietzenbach (DE); Leif Wiebking, München (DE)

(73) Assignee: Siemens Aktiengesellschaft, München (DE)

( * ) Notice: Subject to any disclaimer, the term of this patent is extended or adjusted under 35 U.S.C. 154(b) by 795 days.

(21) Appl. No.: 14/781,471

(22) PCT Filed: Apr. 1, 2014

(86) PCT No.: PCT/EP2014/056499
§ 371 (c)(1),
(2) Date: Sep. 30, 2015

(87) PCT Pub. No.: WO2014/161838
PCT Pub. Date: Oct. 9, 2014

(65) Prior Publication Data
US 2016/0146110 A1    May 26, 2016

(30) Foreign Application Priority Data

Apr. 4, 2013 (DE) .................. 10 2013 205 979

(51) Int. Cl.
*F02C 7/26* (2006.01)
*F01K 3/12* (2006.01)
(Continued)

(52) U.S. Cl.
CPC .................. *F02C 7/26* (2013.01); *F01K 3/12* (2013.01); *F01K 13/02* (2013.01); *F02C 6/18* (2013.01); *Y02E 20/14* (2013.01); *Y02E 20/16* (2013.01)

(58) Field of Classification Search
CPC ...... F02C 6/14; F02C 6/18; F02C 7/26; F02C 1/00; F02C 1/002; F02C 1/007;
(Continued)

(56) References Cited

U.S. PATENT DOCUMENTS 7,644,573 B2 * 1/2010 Smith ................... F01K 23/101
                                                   60/39.182
8,429,891 B2 * 4/2013 Bryant .................... F02C 7/047
                                                   244/134 R
(Continued)

FOREIGN PATENT DOCUMENTS

CN   101287892 A   10/2008
CN   101351621 A   1/2009
(Continued)

OTHER PUBLICATIONS

Yuan et al, "4×150MW coal-fired power plant black start diesel generating set selection research", Guangdong Electric Power, vol. 25, No. 3, pp. 44-47, Mar. 2012 (Abstract in English).
(Continued)

*Primary Examiner* — Jason H Duger
(74) *Attorney, Agent, or Firm* — Beusse Wolter Sanks & Maire (57) ABSTRACT

A thermal power plant, in particular to a steam-electric power plant or a combined cycle power plant (CCPP), and a method for operating a thermal power plant is adapted to accelerate, or to technically and/or economically optimize the start-up of the thermal power plant, in particular to accelerate/optimize a cold-start phase of the thermal power (Continued)

station. The thermal power plant has an auxiliary energy store integrated into the power plant. The store, during the start-up of the thermal power plant, delivers energy for heating/pre-heating components and/or media of the thermal power plant, or supplies an electrical power distribution network.

10 Claims, 3 Drawing Sheets

(51) Int. Cl.
*F01K 13/02* (2006.01)
*F02C 6/18* (2006.01)

(58) Field of Classification Search
CPC .... F02C 3/30; F02C 3/305; F02C 6/04; F02C 7/047; F02C 7/08; F02C 9/18; F02C 9/28; F01K 3/12; F01K 13/02; F01K 3/02; F01K 3/08; F01K 1/08; F01K 11/02; F01K 17/025; F01K 23/10; Y02D 20/14; Y02D 20/16; H02J 15/00; F01D 13/02; F01D 19/02; F01D 19/00; F01D 25/10
See application file for complete search history.

(56) References Cited

U.S. PATENT DOCUMENTS

| | | | | |
|---|---|---|---|---|
| 8,695,342 B2* | 4/2014 | Fredriksson | | F01D 5/08 60/646 |
| 8,971,064 B2* | 3/2015 | Pena | | F02C 1/00 290/1 R |
| 2004/0027004 A1* | 2/2004 | Bayoumi | | H02J 3/38 307/43 |
| 2005/0235649 A1* | 10/2005 | Baer | | F02C 7/12 60/772 |
| 2008/0092551 A1* | 4/2008 | Skowronski | | F01K 23/10 60/783 |
| 2009/0249788 A1 | 10/2009 | Diesterbeck et al. | | |
| 2009/0288415 A1 | 11/2009 | Gobrecht et al. | | |
| 2011/0167820 A1 | 7/2011 | Fredriksson et al. | | |
| 2013/0011704 A1* | 1/2013 | Horne | | H01M 8/0258 429/72 |
| 2014/0090378 A1 | 4/2014 | Dengel | | |
| 2014/0102073 A1* | 4/2014 | Pang | | F01K 3/00 60/39.182 |

FOREIGN PATENT DOCUMENTS

| | | |
|---|---|---|
| CN | 102128061 A | 7/2011 |
| DE | 4138288 A1 | 6/1993 |
| DE | 102010041144 A1 | 3/2012 |
| DE | 102011100517 A1 | 11/2012 |
| EP | 2348199 A2 | 7/2011 |
| EP | 2351912 A1 | 8/2011 |
| JP | 2002129909 A | 5/2002 |
| WO | 2012038178 A1 | 3/2012 |

OTHER PUBLICATIONS

Http://de.wikipedia.org/wiki/Dampfkraftwerk; Apr. 4, 2013.
Ulrich Grumann et al, "Improvement of operational efficiency based on fast startup plant concepts", XXIst World Energy Congress, Montreal, Sep. 12-16, 2010.
http://de.wikipedia.org/wiki/Energiespeicher; Apr. 4, 2013.

* cited by examiner

OPTIMIZATION OF COLD STARTS IN THERMAL POWER STATIONS, IN PARTICULAR IN STEAM-ELECTRIC POWER PLANTS OR IN COMBINED CYCLE POWER PLANTS (CCPPS)

CROSS REFERENCE TO RELATED APPLICATIONS

This application is the US National Stage of International Application No. PCT/EP2014/056499 filed Apr. 1, 2014, and claims the benefit thereof. The International Application claims the benefit of German Application No. DE 102013205979.5 filed Apr. 4, 2013. All of the applications are incorporated by reference herein in their entirety.

FIELD OF INVENTION

The invention relates to a thermal power plant, in particular a steam-turbine or gas-and-steam turbine power plant (combined cycle power plant, CCPP), and also to a method for operating a thermal power plant, in particular a steam-turbine or gas-and-steam turbine power plant.

BACKGROUND OF INVENTION

Steam-turbine power plants or just "steam power plants," for short, are known.

A steam power plant is a type of thermal power plant for generating electricity from fossil fuels, in which thermal energy from steam—in this case—is converted in a steam turbine system or in a steam turbine to energy of motion and is converted further in a generator into electrical energy.

In the case of such a steam power plant, the steam necessary for operating the steam turbine is first generated in a steam boiler, heated by means of the fossil fuel, from (feed) water that has generally previously been cleaned and prepared. By further heating of the steam in a superheater, the temperature and specific volume of the steam increase.

From the steam boiler, the steam flows via pipelines into the steam turbine, where it gives off part of the energy it has previously taken up to the turbine as energy of motion. Coupled to the turbine is a generator, which converts mechanical power into electrical power.

After that, the expanded and cooled steam flows into the condenser, where it condenses by heat transfer to the surroundings and collects as liquid water.

By passing through condensate pumps and preheaters, the water is intermediately stored in a feed-water tank and then fed via a feed pump once again to the steam boiler, thereby completing a cycle ("original power plant process").

A distinction is drawn between various types of steam power plant—depending on the fuel that is used for generating the steam—such as for example coal-fired power plants or oil-fired power plants.

Other categories of thermal power plants are also known, such as for example gas-turbine power plants (also gas power plants for short) or—as a combination of gas and steam power plants—so-called combined gas-and-steam power plants or gas-and-steam turbine power plants (also combined cycle power plants for short).

A gas power plant is a thermal power plant with a gas turbine system comprising a compressor, a combustion chamber with usually a number of burners, and a gas turbine for generating electricity.

A gas-turbine power plant is operated with fluid fuels. These fuels are generally hydrocarbons, alcohols, coal gas or natural gas. These fluids are the fuel for the gas turbine system, the gas turbine of which drives a generator coupled to it for generating electricity.

In the process, the compressor, which is likewise mechanically coupled to the gas turbine and driven by it, initially sucks in fresh air for the combustion process and compresses it to values that usually lie in the range of 15 bar-20 bar.

The compressed air is fed with the fuel to the combustion chamber. There, the mixture of fresh air and fuel is ignited by means of the burner or burners, in order then to burn there, with combustion gases—substantially carbon dioxide, steam, nitrogen and oxygen—reaching temperatures of up to about 1500° C. and higher.

The hot exhaust gases then flow into the gas turbine, in which they give off part of their thermal energy to the gas turbine by expansion as energy of motion.

The mechanical power is then converted by the generator coupled to the gas turbine into electrical power, which is fed as electric current into an electricity supply system ("original power plant process").

From the gas turbine outlet, exhaust gases or flue gases (rich in carbon dioxide) are carried away either directly or sometimes also via a heat exchanger.

A combined cycle power plant (CCPP) is a thermal power plant in which the principles or cycles of a gas power plant and a steam power plant are combined. The gas turbine serves in this case—by way of its hot exhaust gases—as a heat source for a downstream waste-heat boiler of the steam power plant, which on the customary principles of the steam power plant in turn acts as a steam generator for the steam turbine.

It is also known that a thermal power plant is "run" by means of a so-called control and protection system—as a component part of a power plant—usually by an operator of a control station. In other words, a control and protection system of a power plant, here a thermal power plant, is usually understood as meaning means and methods that serve for controlling and safeguarding the power plant.

Thus, for example, the control and protection system includes indicating all of the information occurring in a power plant—here a thermal power plant—such as for example measured values, process or status data, in the control station and processing it there in a central control and protection computer—as the central monitoring and control unit of the power plant—on the basis of a central monitoring and control plan. Operating states of individual power plant components are thus indicated, evaluated, monitored and controlled there. The operator can use control elements there to intervene in the operating sequence of the power plant—and thereby run the power plant.

With an increasing proportion of volatile energy, for example from renewable, regenerative energy sources, such as in particular solar or wind energy, generated for example by photovoltaic systems/power plants, solar power plants or wind turbines, as part of an energy mix in an energy distribution network, the conventional, thermal power plants feeding energy into the energy distribution network are increasingly taking on the role of supporting the energy distribution network with control energy and serving as a backup in the form of capacity and control energy for the renewable, volatile energy sources or their corresponding power plants.

As part of this role, the actual energy generation as such in the conventional, thermal power plants can recede into the background to such an extent that after shutting down for a long time they are not required (idle) and cool down, so that when they are started up (again) to be in their operating state, a cold start has to be undertaken (for example after being idle for greater than about 56 hours) instead of a warm start (for example after being idle for about 8 hours to 56 hours).

Because of the type of construction of conventional, thermal power plants, such a cold-starting phase may be between 2 and 8 hours, but under some circumstances even up to 10 hours.

In this (starting-up/cold-starting) phase, however, the thermal power plant cannot supply or market any energy "of its own", but has to buy in energy, for example because of its own demand for energy during/for preheating.

In addition, thermal power plants are not designed or prepared for rapidly repeated shutting down and starting up again, and cold starting also puts an extreme strain on a power plant, which in the case of a cold start of up to 30 hours can mean a decrease in the overall lifetime of a thermal power plant.

It is accordingly desirable to keep the starting up or such a cold-starting phase as short as possible in the case of a thermal power plant and/or to make it have little strain on systems or power plant components.

Here it is known to shorten the starting up or such a cold-starting phase in the case of a thermal power plant by a specific preheating of power plant components, in particular of a turbine system of a power plant; this allows the thermal power plant or its components to be brought to operating temperature more quickly.

For such preheating of a thermal power plant, in particular its components, specifically its turbine or turbine system, energy may be drawn from the energy distribution network.

By means of this (external) energy it is possible to heat an auxiliary steam generator of the thermal power plant, which generates steam of a high quality. This steam is supplied to the turbine/turbine system of the thermal power plant and flows through the turbine/turbine system, whereby the latter is preheated or heated through.

Once sufficient heating of the turbine/turbine system has been achieved, the turbine/turbine system can be activated and then slowly brought up (to an operating point of the thermal power plant or to full load).

Other components that are to be preheated or can be preheated in the case of a thermal power plant are the (steam) boiler or (steam) boiler casing or shaft.

The time is determined here by the components to be preheated in the thermal power plant that have the thickest walls, for example the shaft and the high-pressure steam casing in the case of a steam power plant or the steam turbine system there, since these power plant components need the longest to heat through.

Thus, for example, a modern combined cycle power plant requires about 4 hours for a cold start.

Also known—for shortening cold-starting phases or starting-up times in the case of thermal power plants, here combined cycle power plants—are so-called "Advanced FaCy" or "Hot on the fly" (a "flying start") ("Improvement of operational efficiency based on fast startup plant concepts", Ulrich Grumann et al., Siemens AG Energy Solutions, XXIst World Energy Congress, Montreal, Sep. 12-16, 2010).

In the case of "Advanced FaCy" or a "flying start", the steam turbine of the combined cycle power plant is started up approximately parallel with the gas turbine heating the steam turbine with waste heat, whereby hot steam is admitted to the steam turbine immediately and extremely, but still below its load limit or maximum requisite heating temperature gradient—and consequently it is quickly "brought to temperature". Start-up times in the case of combined cycle power plants can be significantly reduced in this way.

A disadvantage of "Advanced FaCy" or a "flying start" is that its implementation in existing thermal power plants requires a corresponding, complex (subsequent) installation (of power plant hardware and software).

Another disadvantage of "Advanced FaCy" or a "flying start" is that primary energy has to be used for this—with additional costs thus arising. In other words, for example, gas is burned in the gas turbine, and with it the steam part is heated.

Other approaches to countering the cold starting problems described that affect thermal power plants are that of keeping power plant components (permanently) hot, operating the thermal power plant continuously at full load or reducing the power plant to just partial load. However, these approaches entail economic, ecological and/or technical disadvantages and risks.

A classification of energy storage devices, with corresponding examples and properties of such energy storage devices, is known.

Accordingly, energy storage devices can be classified as thermal energy storage devices (heat storage devices, district heat storage devices, thermochemical heat storage devices, latent heat storage devices), chemical energy storage devices (inorganic: galvanic cell (rechargeable battery, battery), redox-flow cell, hydrogen, battery storage power plant; organic: ADP, ATP, AMP, glycogen, carbohydrates, fats, chemical hydrogen storage device), mechanical energy storage devices (kinetic energy (energy of motion): flywheel or flywheel storage device; potential energy (positional energy): spring, pumped storage power plant, compressed air storage power plant, gravity storage power plant) and electrical energy storage devices (capacitor, superconductive magnetic energy storage device).

EP 2 351 912 A1 discloses a thermal power plant with a heat storage device that is designed to supply (thermal) energy for heating a turbine of the thermal power plant when starting up the thermal power plant.

DE 10 2010 041 144 A1 describes a thermal power plant with a pressure storage device. This pressure storage device—with fluid under pressure there—is designed to supply energy when starting up the thermal power plant—in the form of or by feeding the compressed fluid from the pressure storage device into a machine that generates rotational energy for a turbine of the thermal power plant, and thus drives it—for the operation of the turbine during its starting/starting up.

DE 41 38 288 A1 discloses a thermal power plant with an electrical energy storage device which is designed to supply electrical energy into an energy distribution network during the operation of the power plant to compensate for brief peaks in load.

SUMMARY OF INVENTION

The invention is based on an object of providing a thermal power plant and also a method for operating a thermal power plant that make it possible to meet the requirements, in particular economic, ecological and/or technical requirements, of modern energy distribution, in particular with the fluctuating energy production encountered there.

This object is achieved by a thermal power plant and also by a method for operating a thermal power plant according to the respective independent claim.

The thermal power plant according to aspects of the invention has an additional energy storage device that is intrinsically in the power plant and is designed to supply energy during starting up of the thermal power plant for heating, in particular for preheating, components and/or media of the thermal power plant or for feeding into an electrical energy distribution network, in particular as positive control energy.

In the case of the method according to aspects of the invention for operating a thermal power plant, during starting up of the thermal power plant an additional energy storage device of the thermal power plant that is intrinsically in the power plant supplies energy which is fed into an electrical energy distribution network during the starting up of the thermal power plant, in particular as positive control energy, or with which components and/or media of the thermal power plant, in particular a turbine, a boiler and/or a process gas/steam of the thermal power plant are heated, in particular preheated, during the starting up of the thermal power plant.

Here, the invention means by an additional energy storage device that is intrinsically in the power plant an energy storage device that is not required for the original generation of energy of the thermal power plant ("additional"), but in the case of the invention is functionally integrated directly in the thermal power plant ("intrinsically in the power plant")—as such an additional energy storage device.

This, or this property of being "intrinsically in the power plant", may take the form of such an energy storage device according to the invention that is intrinsically in the power plant being part of the control and protection system of the thermal power plant or being integrated in the control and protection system of the thermal power plant and being controllable/operable by the system—as part of the thermal power plant according to the invention—and/or of such an energy storage device according to the invention that is intrinsically in the power plant being integrated spatially/locationally in the thermal power plant according to the invention, and thus having become directly a system/power plant part thereof, in particular technically in terms of "hardware (for example by piping) and software".

In clear, simplified terms, the invention "extends" a conventional thermal power plant technically and functionally by adding an additional energy storage device, for example in the form of a thermal, electrical, chemical or mechanical energy storage device, which it integrates as an energy supply device into the thermal power plant in such a way that this energy storage device supplies energy during the starting up of the thermal power plant (in a manner corresponding to the energy storage device that is respectively used).

The thermal power plant then uses this energy provided by the additional energy storage device that is intrinsically in the power plant either for heating or preheating components, such as the turbine and/or the boiler, or (working/process) media, such as the process gas/steam, of the thermal power plant, in particular directly (for example by blowing in) or indirectly (for example via a heat exchanger), or for feeding into an electrical energy distribution network instead of energy originally generated by the thermal power plant and fed/to be fed into the energy distribution network.

In this way, by using this additional energy storage device according to the invention that is intrinsically in the power plant or the energy provided by it during the starting up of the thermal power plant, the invention makes it possible to shorten starting-up/cold-starting phases or times in the case of thermal power plants and/or also to save (conserve) energy that otherwise has to be provided in the thermal power plant (for example for operating a gas flame for burner air preheating)—and thus to optimize it—technically, economically and ecologically. Thus, during their heating brought about by the energy storage device according to the invention, the power plant components and/or media can be brought to "temperature" more quickly—and/or in an energy-saving manner. By its energy being fed in (instead of the original energy being fed in by the power plant), the energy storage device according to the invention "relieves" the thermal power plant, with all the more (original power plant) energy being available for starting up. By feeding in its energy during the starting up, the energy storage device according to the invention consequently provides an economic benefit in a phase in which a conventional power plant cannot otherwise market energy.

It is also advantageous in the case of this energy storage device according to the invention that it can be filled/charged in times of inexpensive energy/inexpensive power, such as for example when there is a surplus of renewable energy in the electrical energy distribution network—and thus can make it possible "later" for the cold-starting phase of the thermal power plant to be shortened and its start-up to be quicker and/or else can be marketed directly—in an economically advantageous way.

It is also—economically—advantageous here that the energy for filling/charging the energy storage device according to the invention can be declared or counts as own demand, for which reason it has an exemption from additional charges under the German renewable energy act (EEG).

As the energy storage device for the thermal power plant, the invention may provide a thermal, electrical, chemical or mechanical energy storage device—or else any desired combination of a number of these energy storage devices.

Accordingly, thermal energy storage devices, such as heat storage devices, district heat storage devices, thermochemical heat storage devices, latent heat storage devices, tanks or (electrical) boilers, chemical energy storage devices, such as galvanic cells, rechargeable batteries, batteries, redox-flow cells, hydrogens, battery storage power plants, ADP, ATP, AMP, glycogen, carbohydrates, fats and/or chemical hydrogen storage devices, mechanical energy storage devices, such as flywheels or flywheel storage device, springs, pumped storage power plants, compressed air storage power plants and/or gravity storage power plants, and/or electrical energy storage devices, such as capacitors and/or superconductive magnetic energy storage devices, may be used.

Thus, this energy storage device according to the invention or these energy storage devices according to the invention may then also be part of a control and protection system of the thermal power plant or be integrated in the control and protection system of the thermal power plant and be controlled or run by this system—as part of the thermal power plant according to the invention.

This energy storage device according to the invention or these energy storage devices according to the invention may also be spatially/locationally integrated in the thermal power plant according to the invention—and thus become directly a system/power plant part thereof.

If a combination of—for example two—energy storage devices is provided, the energy of the one energy storage device may be used for operating the other energy storage device.

For example, it is possible in this way to operate a thermal energy storage device, such as an electrical boiler, by means of an electrical or chemical energy storage device, such as a rechargeable battery. Then—in the starting-phase/cold-starting phase—the thermal energy storage device can supply the energy for heating or feeding in. In times of inexpensive energy/power, the electrical/chemical energy storage device can be charged.

Also, when using a number of energy storage devices according to the invention, both the heating according to the invention and the feeding in according to the invention can be provided during the starting up of the thermal power plant. Thus, for example, a thermal energy storage device may be used for the heating of the components/media of the thermal power plant during the starting up of the thermal power plant—and—an electrical or chemical or mechanical energy storage device may be used for the feeding of electrical energy into the energy distribution network during the starting up of the thermal power plant.

In other words, the thermal power plant may provide a number of the energy storage devices, in particular a thermal energy storage device, which is designed to supply the energy for heating the components/media of the thermal power plant during the starting up of the thermal power plant, and an electrical or chemical or mechanical energy storage device, which is designed to supply the energy for feeding into the electrical energy distribution network during the starting up of the thermal power plant.

With advantages, a tank, in particular a pressurized tank, for example an oil tank or the like, may be used as the thermal energy storage device. Such tanks can be obtained or can be used at low cost. The thermal energy storage device may also be a boiler, in particular a steam, electrode or heating boiler, in particular also an electrical boiler.

Thus, the thermal energy of such a thermal energy storage device can then be used for heating/preheating, it can also serve for increasing the energy level, for example as in the case of a reheating of process steam between a high-pressure and a medium-pressure part or between the medium-pressure part and a low-pressure part of a multipart steam turbine—without the "original" power plant having to be used here.

The heating or preheating can then take place directly by blowing the thermal energy, i.e. hot steam/gas, into/onto components, and also indirectly through a heat exchanger, which then transfers the thermal energy to another medium, such as the process steam/gas and/or the burner air.

It is also of advantage here to fill this thermal energy storage device, such as such a tank or boiler, with process gas/steam of the thermal power plant during its operating time. Thus, for example, process steam can be bled off at a steam turbine (control bleed), in particular at/after a high-pressure part of a multipart steam turbine and the thermal energy storage device or the tank/boiler can be filled thereby.

It is also possible here to provide an additional electrical boiler for the charging/filling of the thermal energy storage device or tank, which then can also offer—in addition to its capability of generating and/or storing the thermal energy or steam for a later preheating and/or filling/charging of the thermal energy storage device or tank—negative control energy.

The offering of negative control energy and/or the generating/storing of thermal energy or the filling/charging of the thermal energy storage device may thus also take place outside the operation of the thermal power plant.

If "pressureless" thermal energy storage devices, such as "simple" tanks under atmospheric pressure, are used, thermal energy—in the form of heat—up to about 98° C.—of high quality—can be stored there.

If "higher-energy thermal energy", i.e. steam at higher temperatures, is to be stored, pressurized tanks/boilers or electrical boilers with integrated pressure storage devices may be used.

It is of particular advantage in the case of electrical boilers (also in combination with tanks) moreover that their energy can be generated from inexpensive power, with sometimes a "negative" price. This has the consequence that the efficiency of the thermal power plant is not reduced by either the storing of the thermal energy into the electrical boiler (or tank) or by a conventional start or starting up of the thermal power plant, which thus also makes cost advantages possible.

An electrical or chemical energy storage device may be a capacitor or a rechargeable battery.

Here, too, it may be expedient to fill/charge this energy storage device during times of inexpensive energy/inexpensive power, such as for example when there is a surplus of renewable energy in the electrical energy distribution network.

By means of such an electrical or chemical energy storage device, both positive control energy (during feeding in) and negative control energy (during charging/filling) can thus also be offered.

In the case of a filled/charged energy storage device, it is then also possible to start the thermal power plant from a black start and—in accordance with the size of its storage—for it to be directly on the electrical energy distribution network while the thermal power plant is still being started up.

It is similarly possible when using the energy made available by such an electrical or chemical energy storage device to operate a thermal energy storage device, for example an (electrical) boiler.

In particular, it is thus of advantage in the case of an electrical or chemical energy storage device that filling/charging of such an energy storage device does not negatively change an efficiency of the thermal power plant—as otherwise in the case of the previously used forms of optimizing the start-up of thermal power plants.

The thermal power plant according to the invention is suitable in particular for carrying out the method according to the invention or one of the developments explained, and also the method according to the invention for operating the thermal power plant is suitable in particular for being carried out on the gas turbine power plant according to the invention or one of its developments explained.

Further developments of the invention also emerge from the dependent claims and/or from the following explanations. The developments described relate both to the thermal power plant according to the invention and to the method according to the invention for operating a thermal power plant.

The description given so far of advantageous refinements of the invention include numerous features that are reproduced in the individual subclaims, in some cases several together. However, a person skilled in the art will expediently also consider these features individually and group them together into meaningful further combinations.

The invention and its refinement and advantages are explained more specifically below on the basis of exemplary embodiments with reference to the figures.

BRIEF DESCRIPTION OF THE DRAWINGS

Components that are the same or functionally the same have the same designations in the figures, in which.

DETAILED DESCRIPTION OF INVENTION

Figure 1:
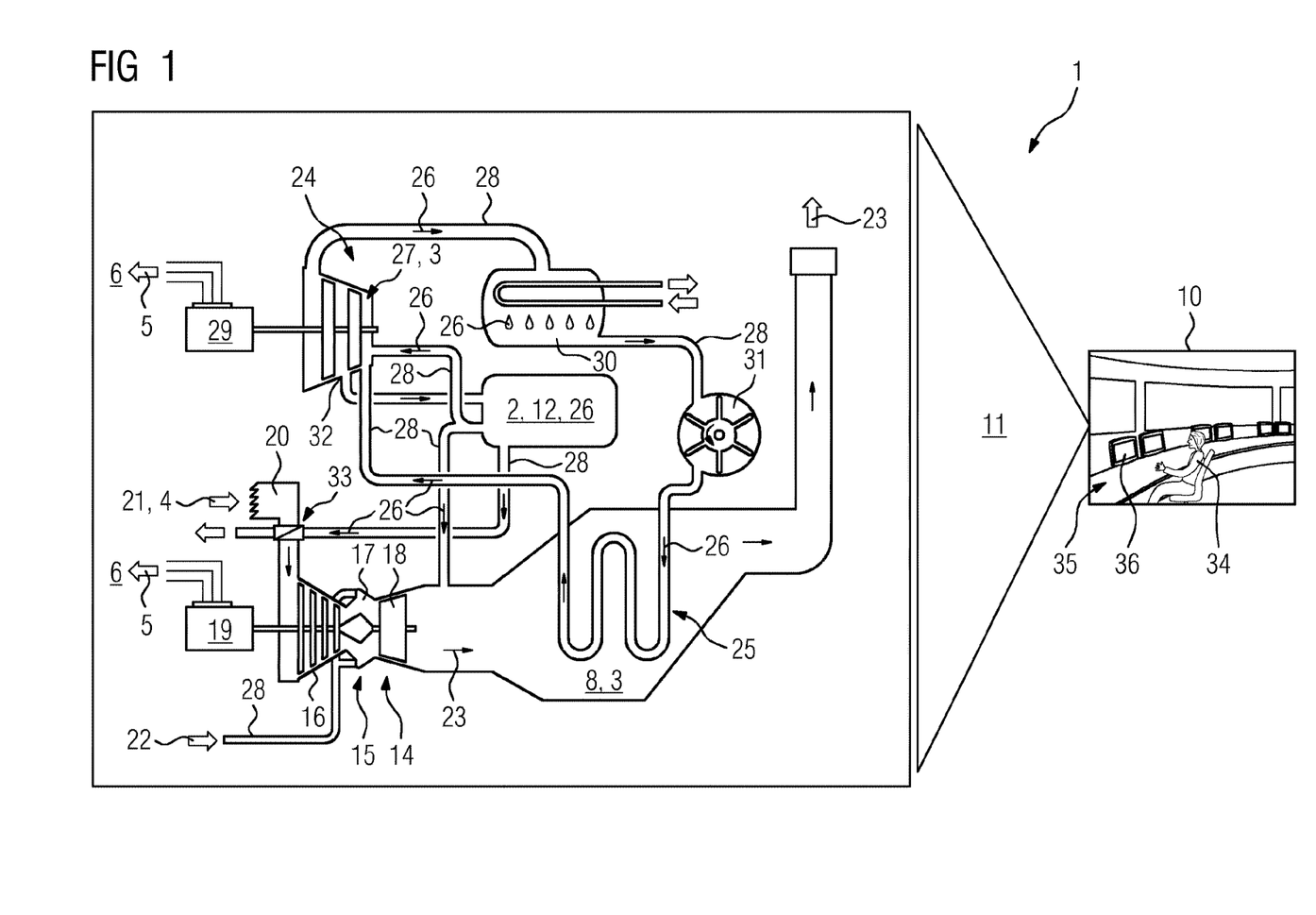
FIG. 1 schematically shows a detail of a combined gas-and-steam power plant with a thermal storage device (tank) that is intrinsically in the power plant for optimizing cold starts according to an exemplary embodiment of the invention, FIG. 2 schematically shows a detail of a combined gas-and-steam power plant with a thermal storage device (tank) that is intrinsically in the power plant and also with an electrical storage device (rechargeable battery) that is intrinsically in the power plant for optimizing cold starts according to an exemplary embodiment of the invention and FIG. 3 schematically shows a detail of a combined gas-and-steam power plant with a thermal storage device (electrical boiler) that is intrinsically in the power plant for optimizing cold starts according to an exemplary embodiment of the invention.

FIG. 1 schematically shows a combined gas-and-steam power plant 1, a combined cycle power plant (CCPP) 1 for short.

The gas turbine part 14 of the combined cycle power plant 1 has a gas turbine system 15 comprising a compressor 16, a combustion chamber 17, which is heated with fluid fuels and comprises a number of burners (not represented), and a gas turbine 18. There is also a generator 19, which is coupled to the gas turbine 18 and is driven by the latter, for generating electricity.

In this case, for the combustion process, the compressor 16, which is likewise mechanically coupled to the gas turbine 18 and driven by it, first sucks in—via a feed 20—fresh or burner air 21 heated by way of a preheating (not shown) that is operated with fuel gas, and compresses this air to values that mostly lie in the range of 15 bar-20 bar.

The compressed (burner) air 21 is fed with the fuel 22 to the combustion chamber 17. There, the mixture of fresh air 21 and fuel 22 is ignited by means of the burner or burners, in order then to burn there, with combustion gases—substantially carbon dioxide, steam, nitrogen and oxygen—reaching temperatures of up to about 1500° C. and higher.

The hot exhaust gases 23 then flow into the gas turbine 18, in which they give off part of their thermal energy to the gas turbine 18 by expansion as energy of motion.

The mechanical power is then converted by the generator 19 coupled to the gas turbine 18 into electrical power, which is fed 5 as electric current into the electrical energy distribution network (electricity supply system) 6.

From the gas turbine outlet, the hot exhaust gases or flue gases 23 (rich in carbon dioxide) are carried away via a waste-heat boiler 8—together with the steam turbine part 24 of the combined cycle power plant 1.

In the waste-heat boiler 8 there takes place—via a heat exchanger 25—the evaporation of generally previously cleaned and prepared (feed) water 26, whereby the steam 26 necessary for operating the steam turbine 27 is generated from the (feed) water 26.

From the waste-heat boiler 8, the steam 26 flows via pipelines/piping 28 into the steam turbine 27 (represented in a simplified multipart form), where it gives off part of the energy it has previously taken up to the steam turbine 27 as energy of motion. Coupled to the steam turbine 27 is a generator 29, which converts mechanical power into electrical power.

After that, the expanded and cooled steam 26 flows into the condenser 30, where it condenses by heat transfer to the surroundings and collects as liquid water 26.

By passing through condensate pumps and preheaters (not represented), the water 26 is intermediately stored in a feed-water tank (not represented) and then fed via a feed pump 31 once again to the waste-heat boiler 8, thereby completing the steam turbine cycle.

A further integrated component of the combined cycle power plant 1 is a tank 12, which can be filled with hot steam 26 by the steam turbine cycle.

For this purpose, this tank 12, which is intrinsically in the power plant, is coupled by a control bleed 32—after the high-pressure part and before the medium-pressure part (not denoted)—of the multistage steam turbine 27 to the latter—and can thus be filled—in the operating phase of the combined cycle power plant 1—with hot steam 26 from the steam turbine cycle, store this steam—here at about 98° C.—and make it available for preheating power plant components 3, such as here the steam turbine 27 and the waste-heat boiler 8, and also for preheating the burner air 21 (medium 4) of the gas turbine 18 or gas turbine system 15.

For this purpose, the tank 12 is connected via piping 28 directly to the steam turbine 27 and the waste-heat boiler 8, whereby the hot steam 26 stored in the tank 12 can be blown into the steam turbine 27 or into the waste-heat boiler 8—and can thereby heat the latter.

Furthermore, the tank 12 is connected via piping 28 and a—here—crossflow heat exchanger 33 to the feed 20 of the burner air 21 of the gas turbine system 15, whereby, i.e. via the crossflow heat exchanger 33, thermal energy can be given off to the burner air 21—and the latter can thereby be heated.

By means of the control and protection system 10, the combined cycle power plant is "run" 11—by the operator 34 of the control station 35.

For this purpose, all of the information/data occurring in the combined cycle power plant 1, such as for example measured values, process or status data, are indicated in the control station 35 and processed there in a control and protection computer 36—as the monitoring and control unit of the combined cycle power plant 1—on the basis of predetermined monitoring and control plans. Operating states of individual power plant components 3 are thus indicated, evaluated, monitored and controlled 11 there. The operator 34 uses control elements, such as pumps 31 and or valves, there to intervene in the operating sequence of the combined cycle power plant 1, whereby the latter is consequently "run" 11.

If—at the request of the load dispatch center—the combined cycle power plant 1 is not "required", and is therefore run down and—with an idle time of for example greater than 60 hours—cooled, it is necessary—when the combined cycle power plant 1 is required again or the combined cycle power plant 1 is started up (again)—to perform a cold start of the combined cycle power plant 1.

In order to shorten the cold-starting phase, the system, i.e. the steam turbine 27, the waste-heat boiler 8 and the burner air 21, is preheated—under the control of the control and protection system 10. For this purpose, the tank 12 filled with hot steam 26—during the prior operation of the combined cycle power plant 1—gives off its hot steam 26 (or thermal energy) via its piping 28 to the steam turbine 27, the waste-heat boiler 8 and (indirectly via the crossflow heat exchanger 33) to the burner air 21, whereby the latter are heated.

Once the heated components 3 or the steam turbine 27, the waste-heat boiler 8 and/or the burner air 21 (medium 4) are sufficiently heated, the steam turbine 27 is activated and then brought up—to its operating point/full load.

As soon as the combined cycle power plant 1 is then running at full load again, the emptied or partly emptied tank 12 can be filled (again)—via the control bleed 32 to the high-pressure part of the steam turbine.

Figure 2:
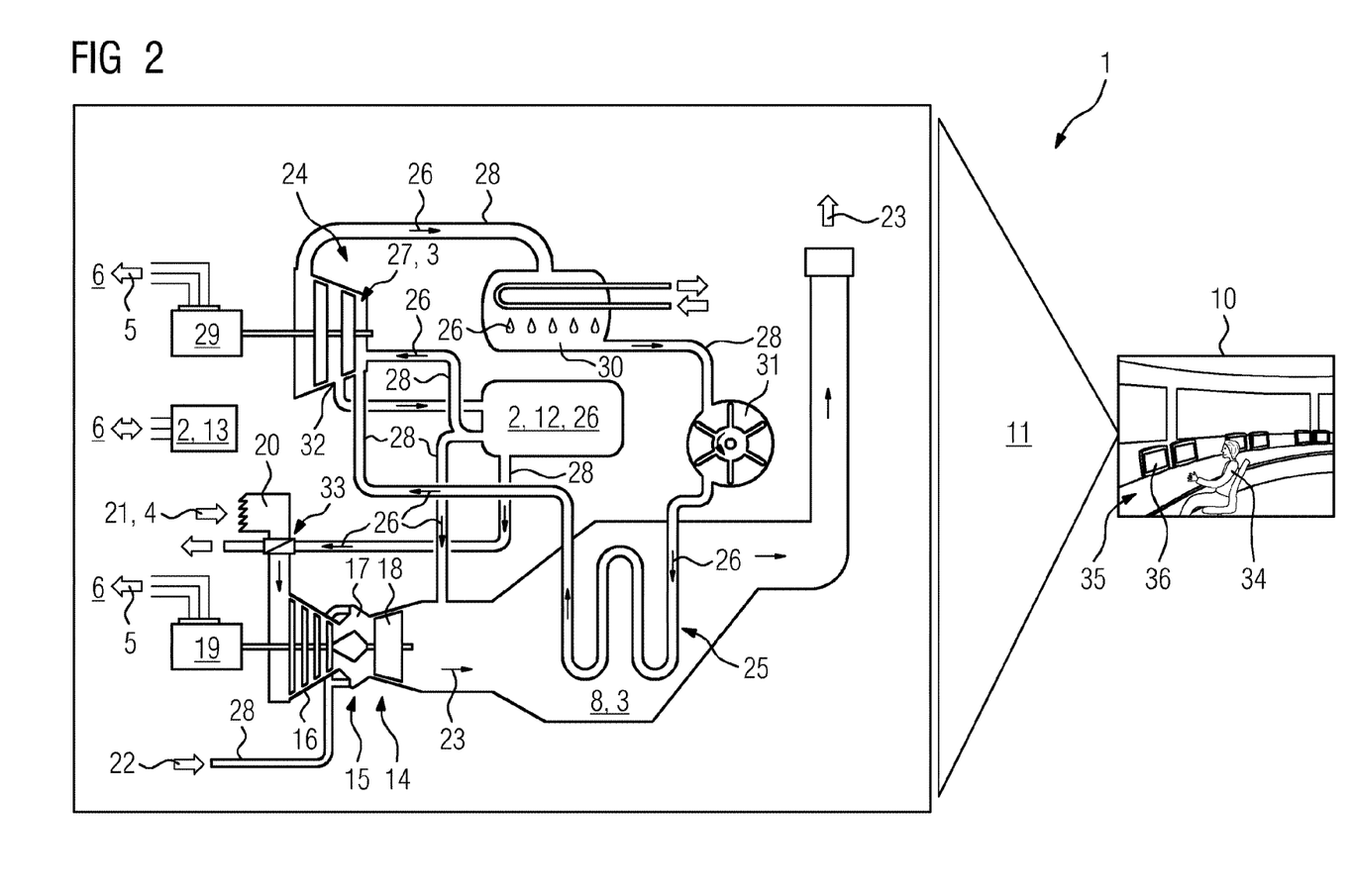

FIG. 2 shows the combined cycle power plant 1 from FIG. 1, further extended by the addition of a rechargeable battery 13 (chemical storage device) (also possible on its own as an alternative to the tank 12). This storage device is also controlled by the control and protection system 10 of the combined cycle power plant 1 and likewise contributes to optimizing and/or shortening the starting up of the combined cycle power plant 1.

This rechargeable battery 13—which can be charged by means of electrical energy from the electrical energy distribution network 6 and also (conversely) can be discharged into the electrical energy distribution network 6—offers initially (even independently of the operating state of the combined cycle power plant 1) positive control energy (discharging into the electrical energy distribution network 6) and negative control energy (charging by the electrical energy distribution network 6).

Once the rechargeable battery 13 is charged—here at times of inexpensive energy of the electrical energy distribution network 6—it is used to start up the combined cycle power plant 1 (in addition or as an alternative to the preheating by the tank 12) from being idle—or after being idle for some time by way of the cold start (black start)—and—in accordance with the charging capacity of the rechargeable battery 13 and the electrical energy it gives off to/into the electrical energy distribution network 6—may be directly on the electrical energy distribution network 6 (marketing) while it, i.e. the combined cycle power plant 1, is still being started up.

The charging of the rechargeable battery 13 does not have any negative influence here on the efficiency of the combined cycle power plant 1.

Figure 3:
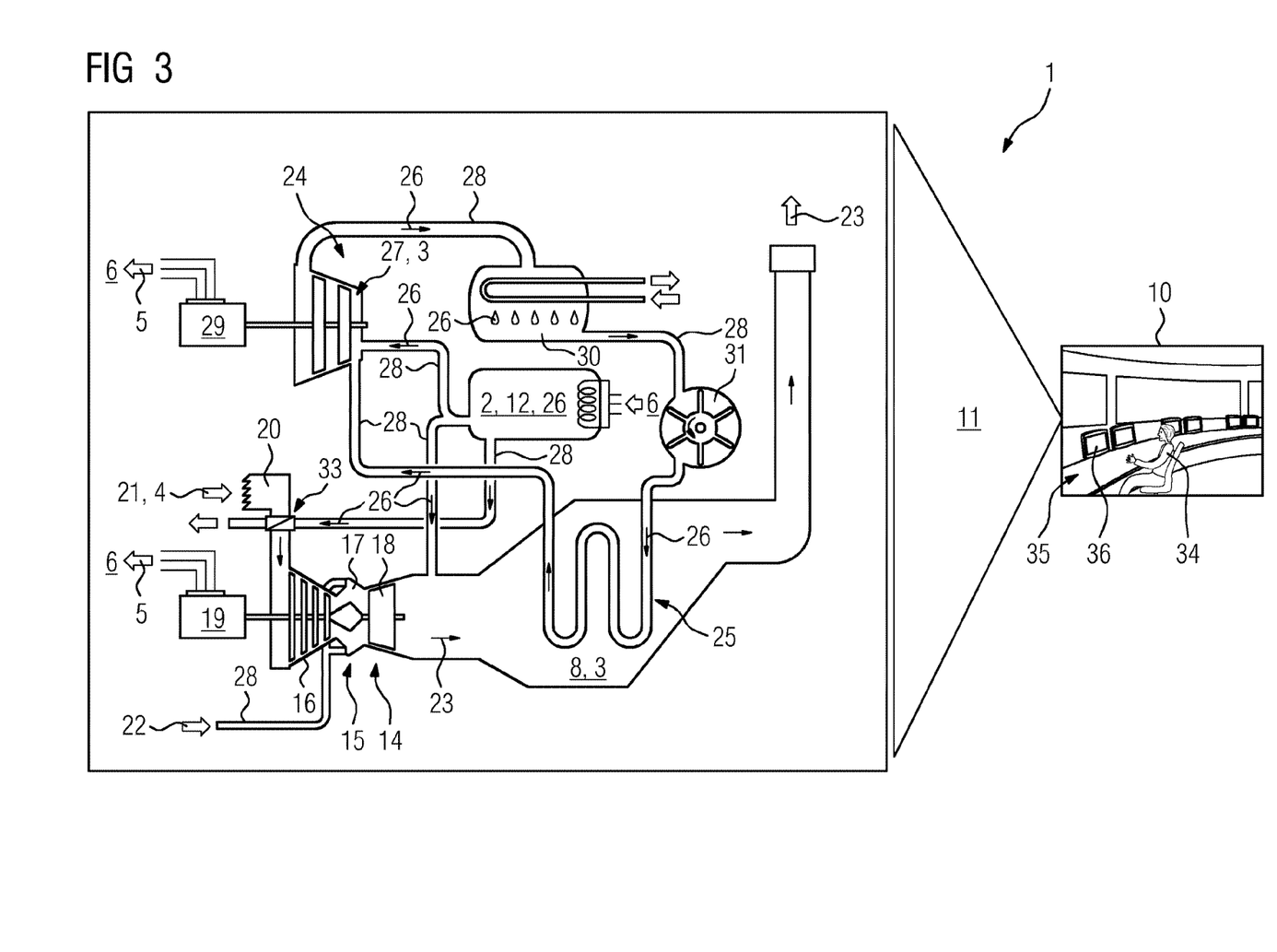

FIG. 3 shows the combined cycle power plant 1 from FIG. 1, in which, instead of the tank 12, an electrically heatable boiler 12 that is otherwise functionally identical to the tank 12 (for the preheating and shortening/optimizing of the starting-up time) is used for the preheating for shortening/optimizing the starting up/the cold-starting phase.

This boiler 12—which can be operated/heated by means of electrical energy from the electrical energy distribution network 6—offers not only the capability of generating and storing the steam 26 for the preheating (itself) (and also making it available for the preheating of the steam turbine 27, the waste-heat boiler 8 and the burner air 21), but also the option of being able to offer a negative control energy.

Thus—by taking negative control energy from the electrical energy distribution network 6—here the electrical boiler 12 can be filled and hot steam 26 generated and stored there even without the combined cycle power plant 1 being in operation.

If a rechargeable battery 13, as described on the basis of FIG. 2, is additionally used here (not represented), this rechargeable battery 13 may also operate the electrical boiler 12.

Although the invention has been more specifically illustrated and described in detail by the preferred exemplary embodiments, the invention is not restricted by the disclosed examples and other variations can be derived herefrom by a person skilled in the art without departing from the scope of protection of the invention.

LIST OF DESIGNATIONS 1 thermal power plant, steam power plant, gas power plant, combined cycle power plant (CCPP)
2 (additional) energy storage device (that is intrinsically in the power plant), electrical, thermal, chemical, mechanical energy storage device, first/second (additional) energy storage device (that is intrinsically in the power plant)
3 component, components
4 medium, media
5 feeding in
6 (electrical) energy distribution network
8 boiler, waste-heat boiler
10 control and protection system
11 controlling, monitoring and running of the system
12 tank, pressurized tank, boiler, steam boiler, electrode boiler, heating boiler
13 rechargeable battery
14 gas turbine part
15 gas turbine system
16 compressor
17 combustion chamber
18 gas turbine
19 generator
20 feed
21 fresh air, burner air
22 fuel
23 hot exhaust gases, flue gases
24 steam turbine part
25 heat exchanger
26 feed water, steam, (condensed) water, process steam
27 steam turbine
28 piping, pipeline(s)
29 generator
30 condenser
31 (feed) pump
32 control bleed
33 (crossflow) heat exchanger
34 operator
35 control station
36 central control and protection computer

The invention claimed is:

1. A thermal power plant, comprising
an additional thermal energy storage device that is intrinsically in the thermal power plant and is adapted to supply energy during starting up of the thermal power plant,
wherein the additional thermal energy storage device is a tank or a boiler adapted to be filled with a process gas of the thermal power plant during an operation of the thermal power plant;
an air inlet;
a crossflow heat exchanger that is in fluid communication with the air inlet,
wherein the process gas of the thermal power plant is steam,
wherein the additional thermal energy storage device is adapted to provide the process gas to the crossflow heat exchanger during the starting up of the thermal power plant to heat a stream of inlet air flowing through the air inlet and the crossflow heat exchanger;
a waste-heat boiler,
wherein the additional thermal energy storage device is adapted to provide the process gas to the waste-heat boiler during the starting up of the thermal power plant;
a steam turbine,
wherein the additional thermal energy storage device is coupled to the steam turbine by a control bleed, wherein the additional thermal energy storage device is adapted to provide the process gas to the steam turbine during the starting up of the thermal power plant, wherein the control bleed is adapted to bleed off the steam of the steam turbine to fill the additional thermal energy storage device during the operation of the thermal power plant, an additional electrical, chemical or mechanical energy storage device that is intrinsically in the thermal power plant and is adapted to supply energy during the starting up of the thermal power plant for feeding into an electrical energy distribution network.

2. The thermal power plant as claimed in claim 1, wherein the additional electrical, chemical or mechanical energy storage device is a rechargeable battery.

3. The thermal power plant as claimed in claim 1,
wherein the additional thermal energy storage device that is intrinsically in the thermal power plant and the additional electrical, chemical, or mechanical energy storage device that is intrinsically in the thermal power plant are at least one of:
integrated in a control and protection system of the thermal power plant,
controllable by the control and protection system of the thermal power plant,
operable by the control and protection system of the thermal power plant, and integrated spatially in the thermal power plant.

4. The thermal power plant as claimed in claim 1, wherein the thermal power plant is selected from a steam turbine power plant, and a gas-and-steam combined cycle power plant.

5. The thermal power plant as claimed in claim 1,
wherein the additional thermal energy storage device is the tank, and wherein the tank comprises a pressurized tank.

6. The thermal power plant, according to claim 1,
wherein the additional thermal energy storage device is the boiler.

7. The thermal power plant as claimed in claim 6,
wherein the boiler comprises a steam, electrode or heating boiler.

8. A method for operating a thermal power plant,
the thermal power plant comprising
an additional thermal energy storage device that is intrinsically in the thermal power plant and is adapted to supply an additional amount of energy during a starting up of the thermal power plant,
wherein the additional thermal energy storage device is a tank or a boiler adapted to be filled with a process gas of the thermal power plant during an operation of the thermal power plant;
an air inlet;
a crossflow heat exchanger that is in fluid communication with the air inlet,
wherein the process gas of the thermal power plant is steam,
wherein the additional thermal energy storage device is adapted to provide the process gas to the crossflow heat exchanger during the starting up of the thermal power plant to heat a stream of inlet air flowing through the air inlet and the crossflow heat exchanger;
a waste-heat boiler,
wherein the additional thermal energy storage device is adapted to provide the process gas to the waste-heat boiler during the starting up of the thermal power plant;
a steam turbine,
wherein the additional thermal energy storage device is coupled to the steam turbine by a control bleed,
wherein the additional thermal energy storage device is adapted to provide the process gas to the steam turbine during the starting up of the thermal power plant,
wherein the steam is bled off of the steam turbine via the control bleed to fill the additional thermal energy storage device during the operation of the thermal power plant,
an additional electrical, chemical or mechanical energy storage device that is intrinsically in the thermal power plant and is adapted to supply energy during the starting up of the thermal power plant for feeding into an electrical energy distribution network,
the method comprising:
filling the additional thermal energy storage device with the process gas of the thermal power plant during the operation of the thermal power plant;
providing the process gas from the additional thermal energy storage device to the crossflow heat exchanger during the starting up of the thermal power plant to heat a stream of inlet air flowing through the air inlet and the crossflow heat exchanger;
providing the process gas from the additional thermal energy storage device to the waste-heat boiler during the starting up of the thermal power plant;
providing the process gas from the additional thermal energy storage device to the steam turbine during the starting up of the thermal power plant,
supplying the additional amount of energy during the starting up of the thermal power plant from the additional electrical, chemical or mechanical energy storage device that is intrinsically in the thermal power plant; and
feeding the additional amount of energy from the additional electrical, chemical or mechanical energy storage device that is intrinsically in the thermal power plant into the electrical energy distribution network.

9. The method for operating a thermal power plant as claimed in claim 8, wherein the starting up of the thermal power plant is a cold start or a black start.

10. The method for operating a thermal power plant as claimed in claim 8, further comprising
charging the additional electrical, chemical, or mechanical energy storage device by the additional amount of energy supplied to the electrical energy distribution network when there is a surplus of electrical energy in the electrical energy distribution network.

* * * * *